Patented Jan. 21, 1930

1,744,135

UNITED STATES PATENT OFFICE

JACQUE C. MORRELL AND GUSTAV EGLOFF, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

PROCESS OF MAKING RESINS

No Drawing. Application filed January 3, 1928. Serial No. 244,367.

The invention consists in taking a polymeric hydrocarbon and blending it with an organic acid and then subjecting the mixture to the action of a halogen, for example, chlorine, bromine or fluorine.

The invention may be carried out as follows: We may take distillates produced from the cracking of petroleum and separate the polymeric constituents thereof from the rest of the distillate by passing the distillate first through a filter bed, as for example, fuller's earth, or other suitable filter bed, collecting the polymeric hydrocarbons in the bed, where they are separated from the other hydrocarbons, which will pass through the bed and will be drawn off. The polymeric hydrocarbons may then be dissolved out of the fuller's earth by suitable solvent, as for example, alcohol, ether, chloroform, or the like, and the solvent is then distilled out of the polymers. The polymers resulting from the vapor phase treatment of cracked distillates may also be used.

These polymeric hydrocarbons may then be mixed in a suitable vessel or container with a phenolic compound, such as phenol, cresols, tar acids from wood, coal, peat, etc., or other compounds. Through this mixture, preferably at a temperature of, say 300 degrees F., is then passed chlorine gas. The chlorine gas reacts with the mixture and forms resinous materials. The treatment is preferably continued until the mixture has become relatively viscous but in most cases should not be so viscous that it is not sufficiently plastic to permit of it being moulded under pressure. The material is then allowed to cool and is ready for use.

We claim as our invention—

1. A process of producing resins which comprises subjecting a mixture of polymeric hydrocarbons and a phenolic body to the action of a halogen until the mixture has become viscous.

2. A process of producing resins which comprises subjecting a mixture of polymeric hydrocarbons and a phenolic body to the action of a halogen, while maintaining said mixture at an elevated temperature, until the mixture has become viscous.

JACQUE C. MORRELL.
GUSTAV EGLOFF.